(12) United States Patent
Li

(10) Patent No.: US 6,653,602 B2
(45) Date of Patent: Nov. 25, 2003

(54) FOOD SERVING SET FOR ROASTING OVEN

(75) Inventor: George T. C. Li, Carson City, NV (US)

(73) Assignee: Acerne Enterprises, LLC, Carson City, NV (US)

( * ) Notice: Subject to any disclaimer, the term of this patent is extended or adjusted under 35 U.S.C. 154(b) by 0 days.

(21) Appl. No.: 10/124,686

(22) Filed: Apr. 19, 2002

(65) Prior Publication Data

US 2003/0132216 A1 Jul. 17, 2003

Related U.S. Application Data

(63) Continuation-in-part of application No. 10/047,899, filed on Jan. 14, 2002, now Pat. No. 6,593,552.

(51) Int. Cl.$^7$ .................... A47J 27/12; A47J 37/06
(52) U.S. Cl. .............. 219/432; 219/433; 219/386; 99/413; 99/416; 220/23.88
(58) Field of Search .................. 219/429, 432, 219/433; 99/413, 416; 220/23.2, 23.4, 23.88

(56) References Cited

U.S. PATENT DOCUMENTS

| | | | | |
|---|---|---|---|---|
| 590,212 A | * | 9/1897 | Daesch | 99/416 |
| 1,630,787 A | * | 5/1927 | Cullen | 99/416 |
| 2,740,546 A | * | 4/1956 | Kowalski | 220/23.88 |
| 3,038,058 A | * | 6/1962 | Gordon | 219/508 |
| 3,498,494 A | * | 3/1970 | Voorhees | 220/23.88 |
| 3,720,807 A | * | 3/1973 | Ting | 219/439 |
| D230,243 S | * | 2/1974 | Ottenstein | D7/357 |
| 3,908,111 A | * | 9/1975 | Bois et al. | 219/442 |
| 4,039,777 A | * | 8/1977 | Baker | 219/439 |
| D283,666 S | | 5/1986 | Holzkopf | D7/38 |
| D284,727 S | | 7/1986 | Gerber | D7/21 |
| 4,646,628 A | * | 3/1987 | Lederman | 99/413 |
| 4,817,512 A | * | 4/1989 | Vangen | 99/367 |
| D305,855 S | | 2/1990 | Mandat | D7/323 |
| 5,402,714 A | * | 4/1995 | Deneault et al. | 99/416 |
| D358,292 S | | 5/1995 | Goad | D7/366 |
| 5,690,245 A | * | 11/1997 | Jenkins | 220/23.4 |
| 5,865,098 A | * | 2/1999 | Anelli | 99/331 |
| D431,149 S | | 9/2000 | Cooke et al. | D7/354 |
| 6,188,046 B1 | * | 2/2001 | Barrow | 219/433 |
| D459,144 S | * | 6/2002 | Brady | D7/354 |

* cited by examiner

Primary Examiner—Joseph Pelham
(74) Attorney, Agent, or Firm—Clifford F. Rey

(57) ABSTRACT

A food serving set for use in combination with a roasting oven or other similar deep well cooker is disclosed. The present food serving set is comprised of a plurality of individual containers with sealable lids for maintaining food items in a ready-to-eat condition. The individual food containers are suitable for refrigeration of food items. The present serving set features a collapsible supporting rack, which positions such individual containers within the deep well cooker while in use. In one embodiment the supporting rack is foldable for convenient storage or packaging of the serving set within the interior space of the roasting oven. In an alternative embodiment the supporting rack may be easily disassembled for storage using a latching mechanism or other suitable quick connect/disconnect fasteners. In alternative embodiments the food containers include integral peripheral flanges, which are fitted to the inner edge of the cooking vessel and the supporting rack is unnecessary.

10 Claims, 22 Drawing Sheets

FOOD SERVING SET FOR ROASTING OVEN

CROSS-REFERENCE TO RELATED APPLICATION

This application is a continuation-in-part of U.S. patent application Ser. No. 10/047,899, now U.S. Pat. No. 6,593,552, entitled Food Serving Set for Roasting Oven filed Jan. 14, 2002 and claims the benefits provided under 35 USC §120.

FIELD OF INVENTION

The present invention relates to cooking appliances and, more particularly, to a food serving set for use with a roasting oven or other similar deep well cooker including a collapsible supporting rack, which can be folded and/or disassembled for storage and/or packaging within the roasting oven.

BACKGROUND OF THE INVENTION

Electric cooking pots for preparing and serving hot foods are well known in the prior art. Such cooking pots typically include a deep well member and a heating element arranged in functional relation thereto for supplying heat. Such cooking pots may be provided with compartmented trays, which are disposed within the interior space of the cooker for maintaining food in a ready-to-eat condition.

However, such compartmented trays are not convenient for the storage of leftover food items due to size constraints within a typical refrigerator. Further, such serving trays are not conveniently packaged at the time of manufacture due to the lack of available space within the interior cavity of the roasting oven and as a result must be packaged and shipped separately, which increases manufacturing costs.

Thus, the present invention has been developed to resolve this problem and other shortcomings of the prior art.

DESCRIPTION OF RELATED PRIOR ART

U.S. Design Pat. Nos. 230,243; 283,666; 284,727; 305,855; 358,292; and 431,149 disclose cooking appliances and/or compartmented trays of generally similar subject matter in this field of art. However, only the ornamental appearance is illustrated for these devices and no technical disclosure or functional details are discernable.

While these devices fulfill their respective, particular objectives and requirements, the aforementioned patents do not disclose the present invention. The present inventive device comprises a food serving set including a plurality of individual food containers suitable for storage, heating and serving of food items. The food containers are designed to reside in a collapsible supporting rack within the interior space of a roasting oven or other deep well cooker during use. The food containers are suitable for refrigerator storage of leftover food items being provided with sealable lids. The supporting rack may be folded and/or disassembled for storage within the interior space of the deep well cooker after use or during packaging.

In these respects the present invention substantially departs from the conventional concepts and designs of the prior art, and in so doing provides an apparatus primarily developed for the purpose of food service and storage. Advantageously, the present food serving set is conveniently stored and packaged within the interior space of the cooker.

SUMMARY OF THE INVENTION

Accordingly, the present invention provides a serving set for use with a roasting oven or other similar deep well cooker comprised of a plurality of individual containers for maintaining food items in a ready-to-eat condition. The individual food containers are suitable for refrigeration of food items. The present serving set features a collapsible supporting rack, which positions such individual containers within the deep well cooker while in use. In one embodiment the supporting rack is foldable for convenient storage of the serving set within the cavity of the roasting oven. In an alternative embodiment the supporting rack may be easily disassembled for storage using a latching mechanism for the users convenience. In yet another alternative embodiment the collapsible supporting rack is replaced by peripheral supporting flanges, which are integrally formed on the individual food containers to support them within the deep well cooker.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures wherein:

DETAILED DESCRIPTION OF THE PREFERRED EMBODIMENTS

Figure 1:
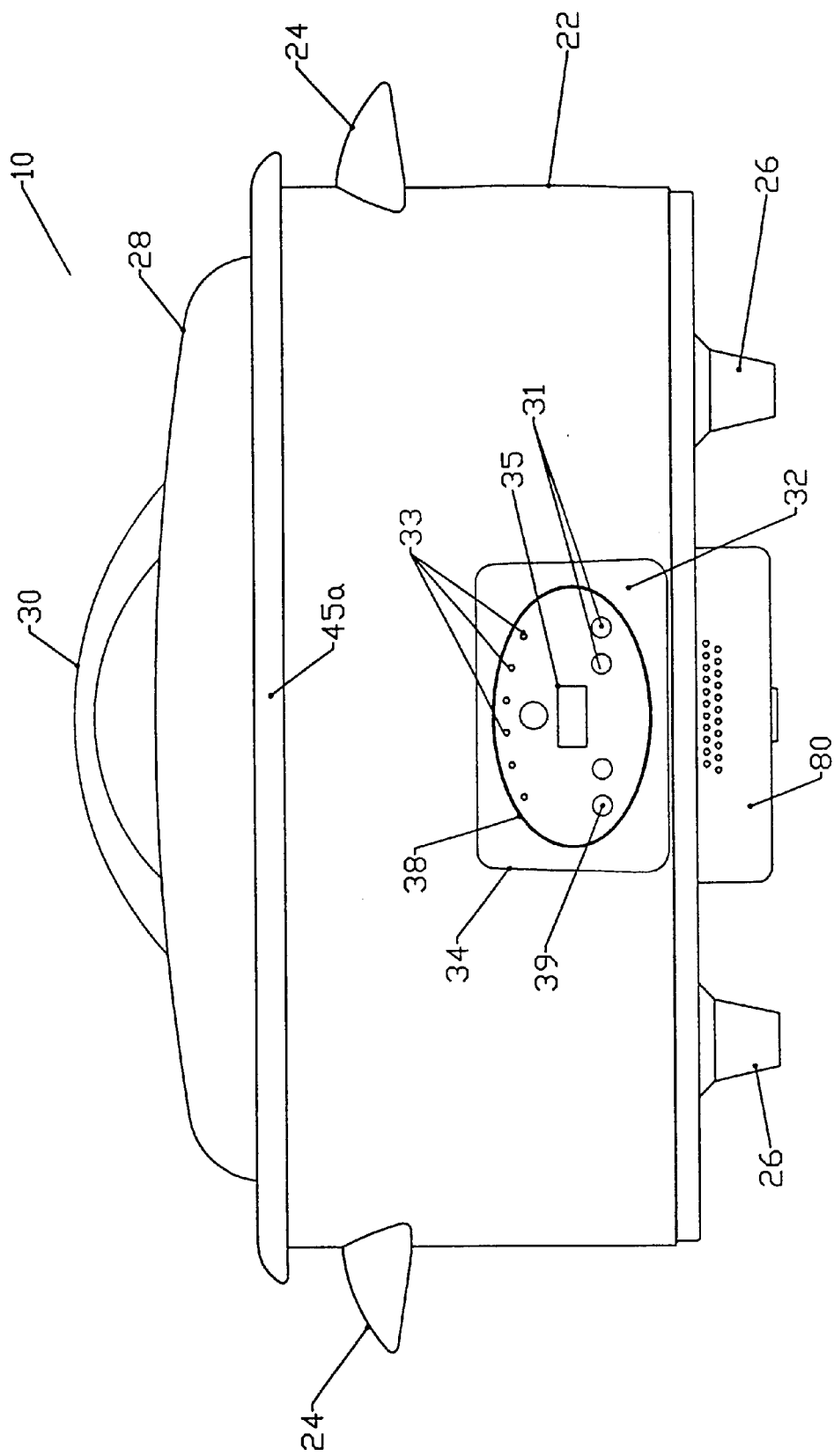
FIG. 1 is a front elevational view of a roasting oven wherein the serving set of the present invention is utilized.

Prior to describing the food serving set of the present invention in detail it may be beneficial to review the structure and function of a roasting oven or other deep well cooker wherein the present serving set is utilized. With further reference to the drawings, there is shown therein a preferred embodiment of a roasting oven in accordance with the present invention, indicated generally at 10, and illustrated in FIG. 1. The present roasting oven 10 is comprised of an outer housing 22 equipped with external handles 24 and feet 26. In the preferred embodiment the housing 22 is constructed of sheet steel or other suitable material and is provided in different exterior finishes. The roasting oven 10 is also provided with a lid 28 equipped with a handle 30. A hinge structure, indicated generally at 75, attaches the lid 28 in opening/closing relation to the housing 22.

Figure 2A:
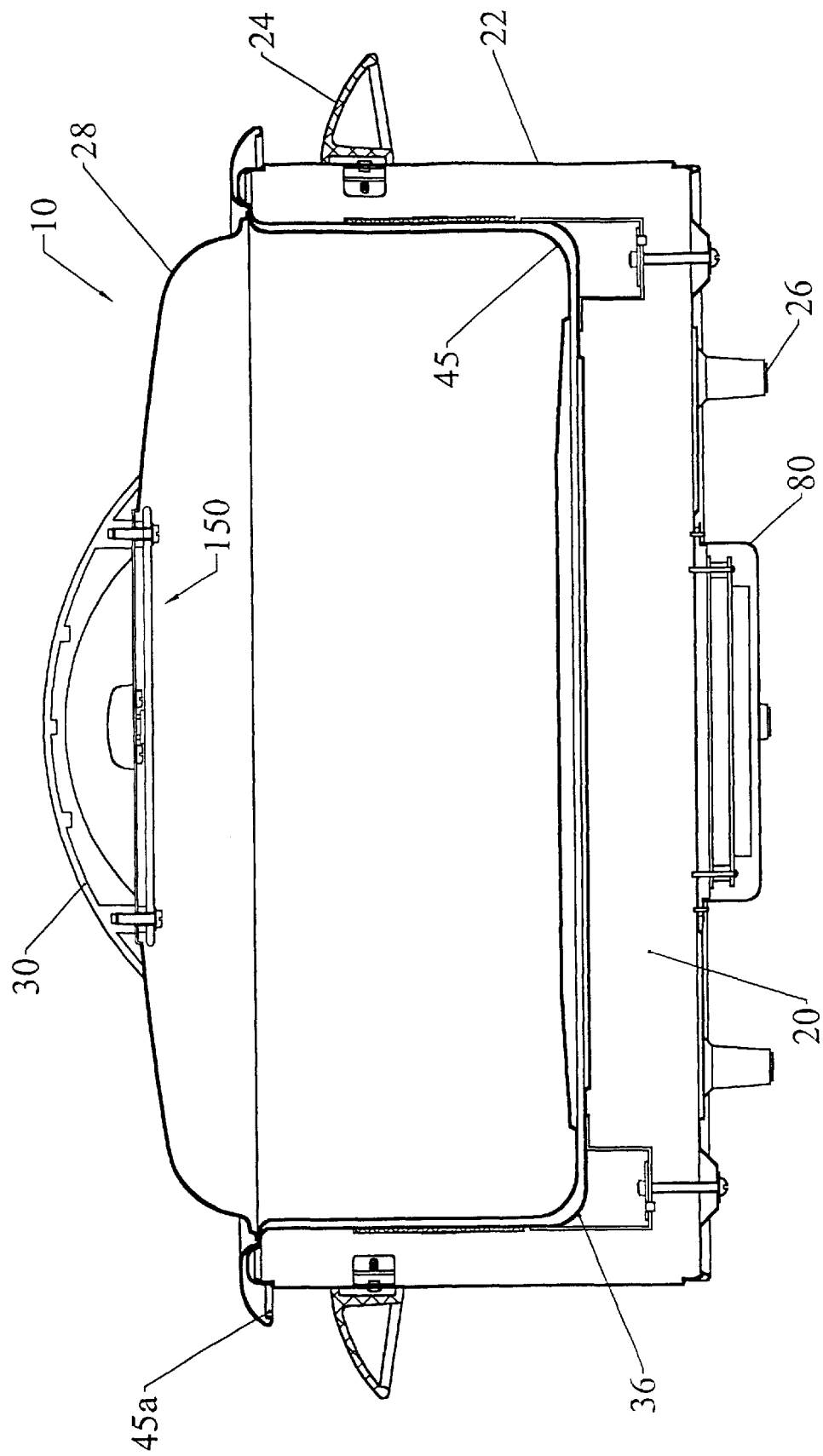
FIG. 2A is a longitudinal cross-section of the roasting oven showing details of the construction thereof.
Figure 2B:
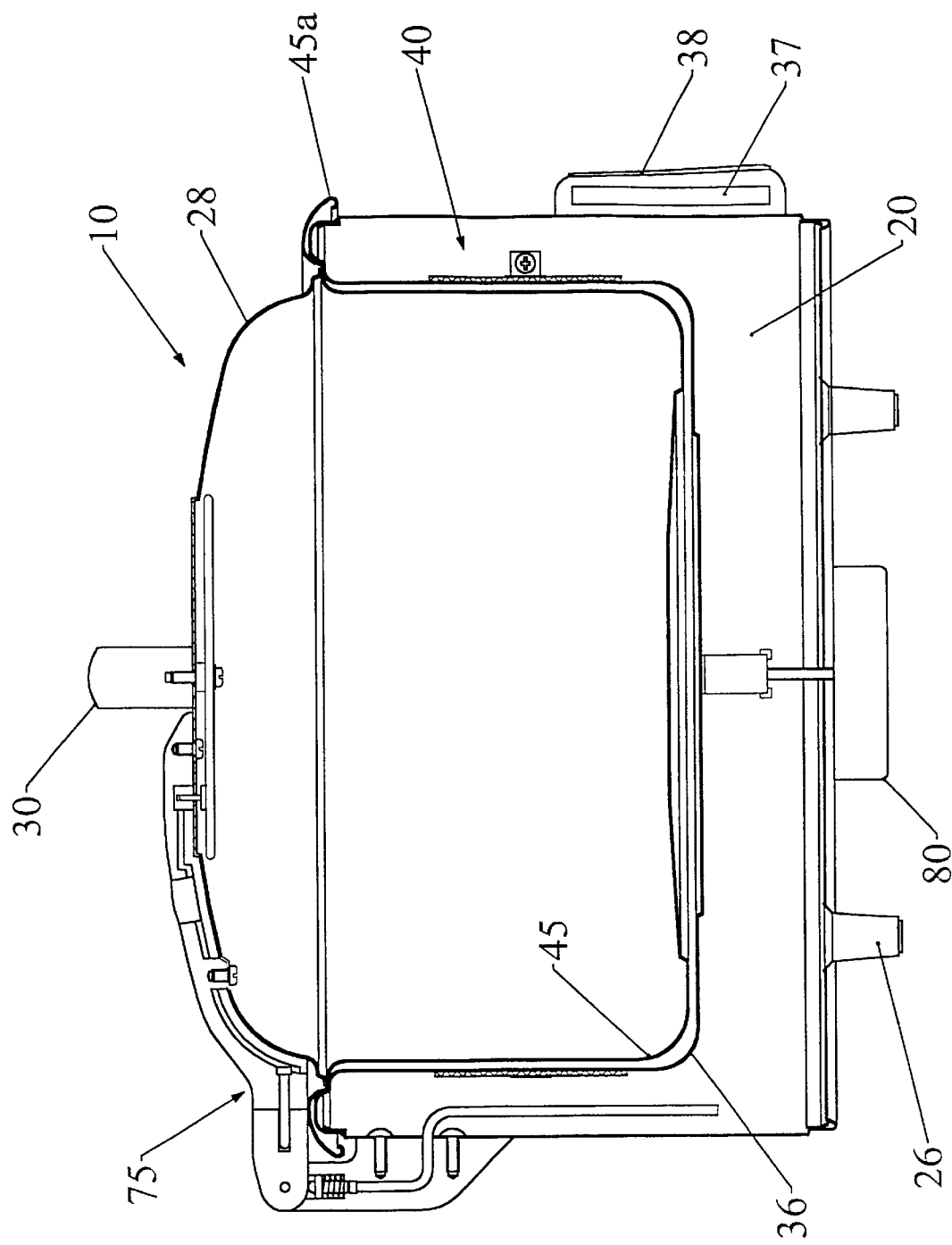
FIG. 2B is a transverse cross-section of the roasting oven showing further details thereof.

The present roasting oven 10 also includes an internal heating well 36 disposed within the housing 22 as more clearly shown in FIGS. 2A and 2B. The heating well 36 is constructed of enamel-coated steel, cast aluminum, cast iron or other material having suitable physical characteristics. Such a roasting oven 10 may include a wrap-around heating element, indicated generally at 40, and/or a top heating element, indicated generally at 150.

In the preferred embodiment the present roasting oven 10 also includes a removable cooking liner 45 including a peripheral flange member 45a which is seated on the upper edge of the housing 22 as shown. The liner 45 is also constructed of stainless steel enamel-coated steel cast aluminum or other suitable material. The cooking liner 45 is easily removed from the heating well 36 for washing for the convenience of the user.

A layer of heat-resistant insulating material (not shown) is disposed in the air space as at 20 between the housing 22 and the cooking well 36 as shown in FIGS. 2A and 2B. Numerous types of heat insulating materials having physical and chemical properties suitable for this application are commercially available. Since such heat insulating materials are well known to those skilled in the art, further detailed discussion of the same is not deemed necessary.

The present roasting oven 10 may be constructed in an oval, rectangular, round or other configurations with minor modifications to the heating elements 40, 150.

Referring again to FIG. 1, a control panel, indicated generally at 32, is typically provided on the lower front surface of the housing 22 to carry out the functions of the roasting oven 10. The control panel 32 includes a plurality of temperature control switches 33 which are electrically interconnected with the wrap-around and/or top heating elements 40, 150 and serve to regulate the operation thereof.

The control panel 32 also includes a digital display 35, cooking mode switches 31, and a power switch 39.

In the preferred embodiment the control panel 32 is comprised of a heat-resistant housing 34 including a flexible, push button film 38 which overlays an electronic control circuit board 37 (FIG. 2B) that provides the user with fingertip control of the cooking functions. A ventilated compartment 80 is provided wherein the power supply circuit board is protected from the heat source.

The present roasting oven 10 is designed for use with standard household and commercial electrical systems. In the preferred embodiment the wrap-around heating element 40 is designed to operate in the range of 1000–1500 watts and the top heating element 150 to operate in the range of 25 to 75 watts. This wattage rating varies for a given application and capacity of the roasting oven.

Figure 3A:
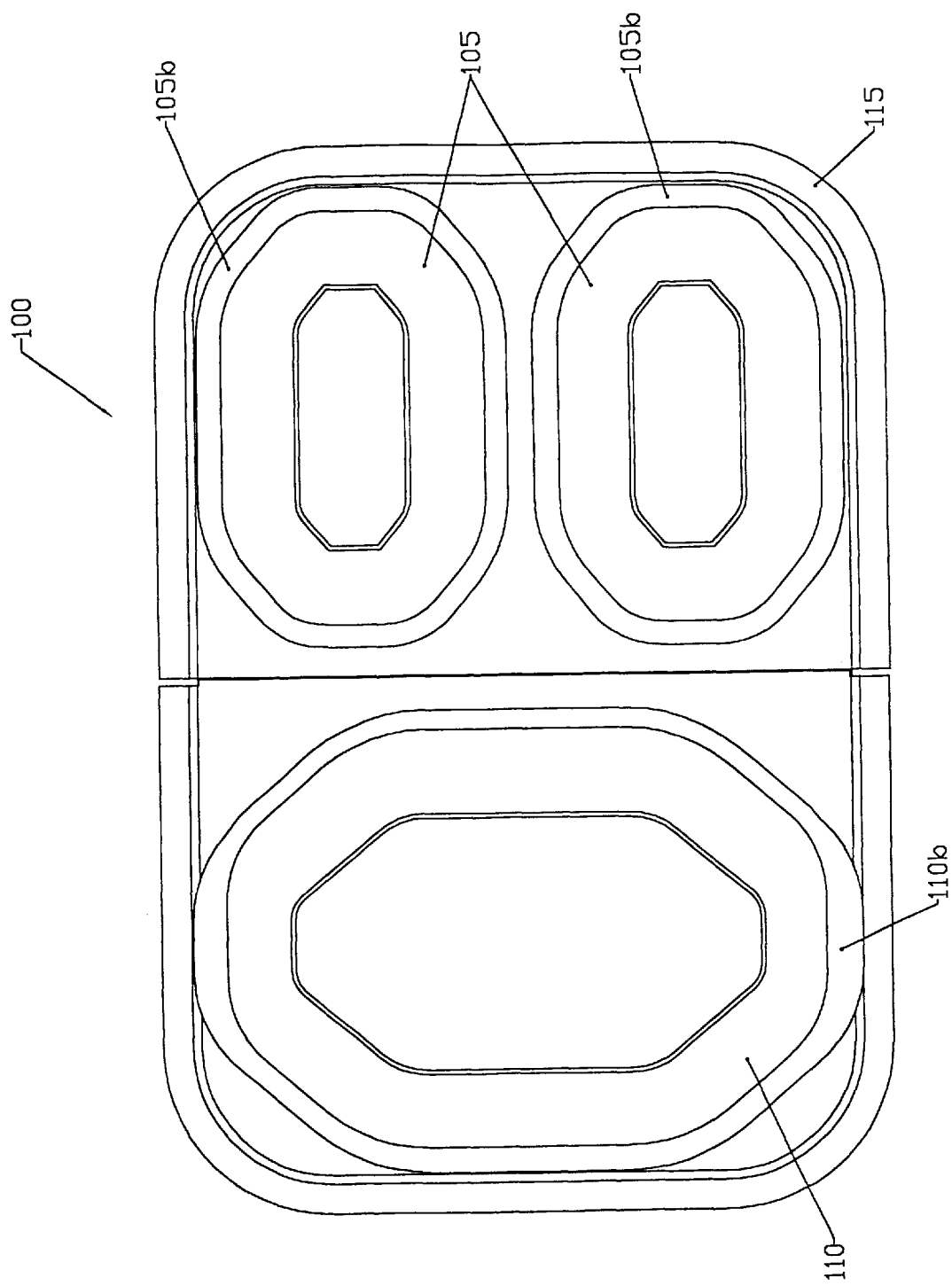
FIG. 3A is a top plan view of the serving set of the present invention.
Figure 3B:
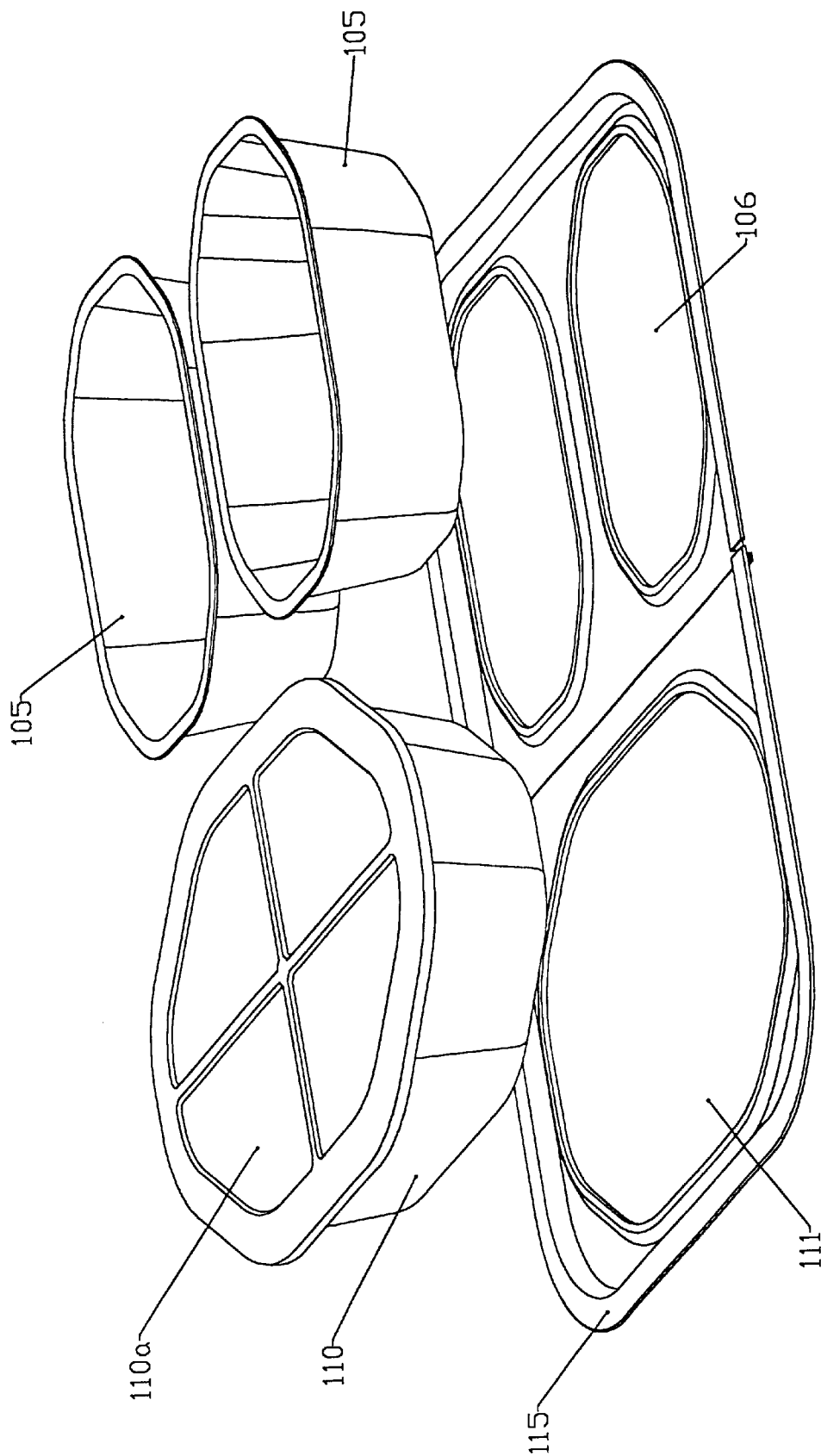
FIG. 3B is an exploded perspective view of the serving set showing the components thereof.

With reference to FIGS. 3A and 3B there is shown therein a food serving set in accordance with the present invention, indicated generally at 100, that is designed for use with such a roasting oven 10. In the preferred embodiment the present serving set 100 is comprised of two small food containers 105 and one large food container 110 each being provided with sealable lid members 105a and 110a respectively and a supporting rack 115 wherein the containers 105, 110 reside during use. It can be seen that the containers 105, 110 are constructed in a generally octagonal shape to conform with mating openings 106 and 111 respectively formed in the supporting rack 115. To this end each container 105, 110 includes a peripheral flange 105b, 110b formed thereon which overlaps and engages a raised edge formed about the periphery of the openings 106, 111 in the supporting rack 115 as shown.

Containers 105, 110 and lid members 105a, 110a respectively may be constructed from heat resistant plastics, engineering resins, sheet metal or other materials having physical and chemical properties suitable for this application.

It will be appreciated that various other geometric shapes and configurations of the containers 105, 110 and mating openings 106, 111 formed in the supporting rack 115 can be utilized. Thus, the embodiments disclosed in the drawings are intended to be merely illustrative and not restrictive in any sense.

Figure 3C:
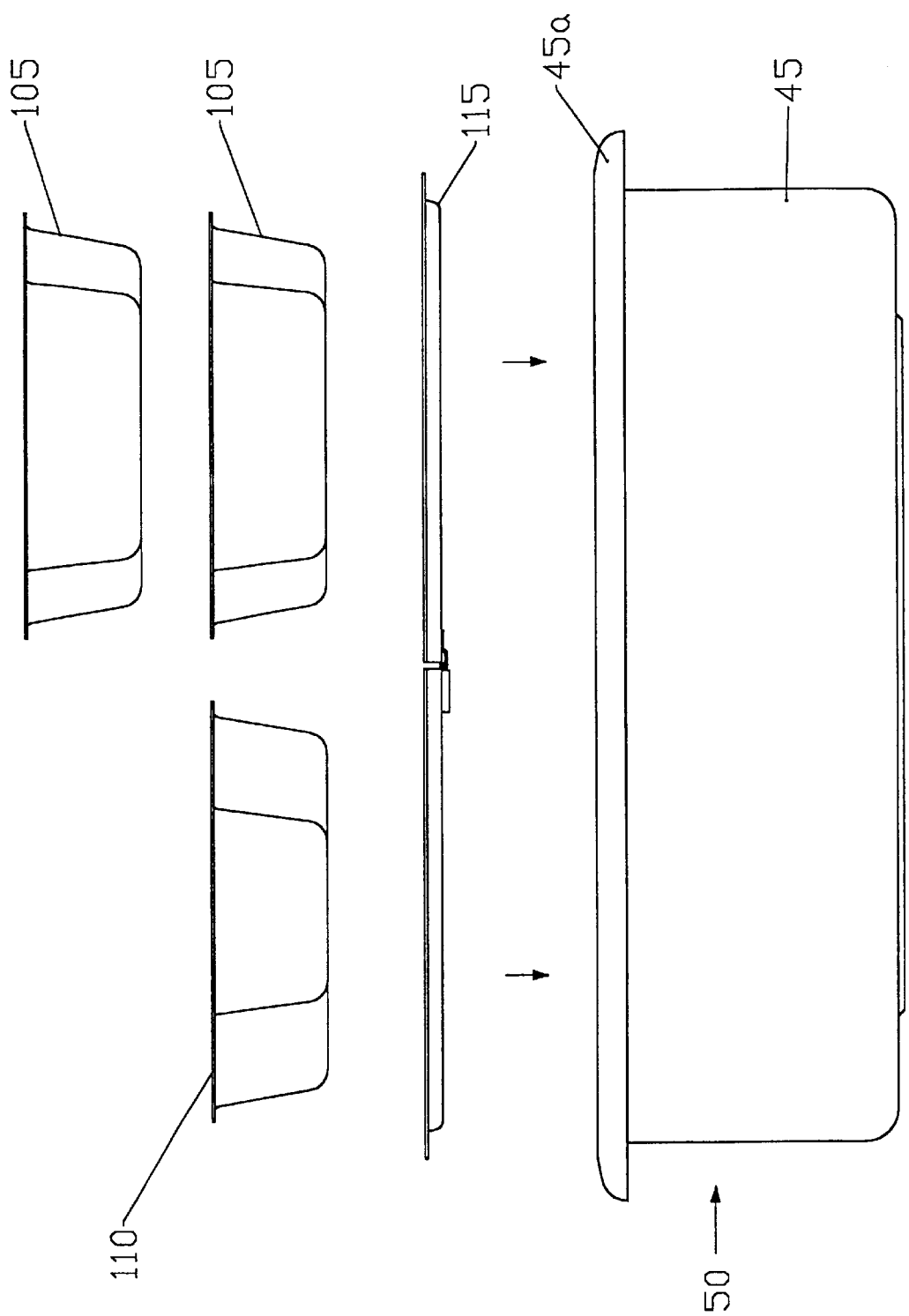
FIG. 3C is an exploded elevational view showing the serving set in relation to the removable liner of the roasting oven.

The supporting rack 115 is configured to reside in the top opening of the roasting oven 10 or other deep well cooker and engages the flange member 45a of the cooking liner 45 as shown in FIG. 3C. In operation the liner 45 is filled with water to a sufficient level as at 50 to contact the food containers 105, 110 when disposed in the supporting rack 115 in order to heat the food items contained therein.

Figure 4:
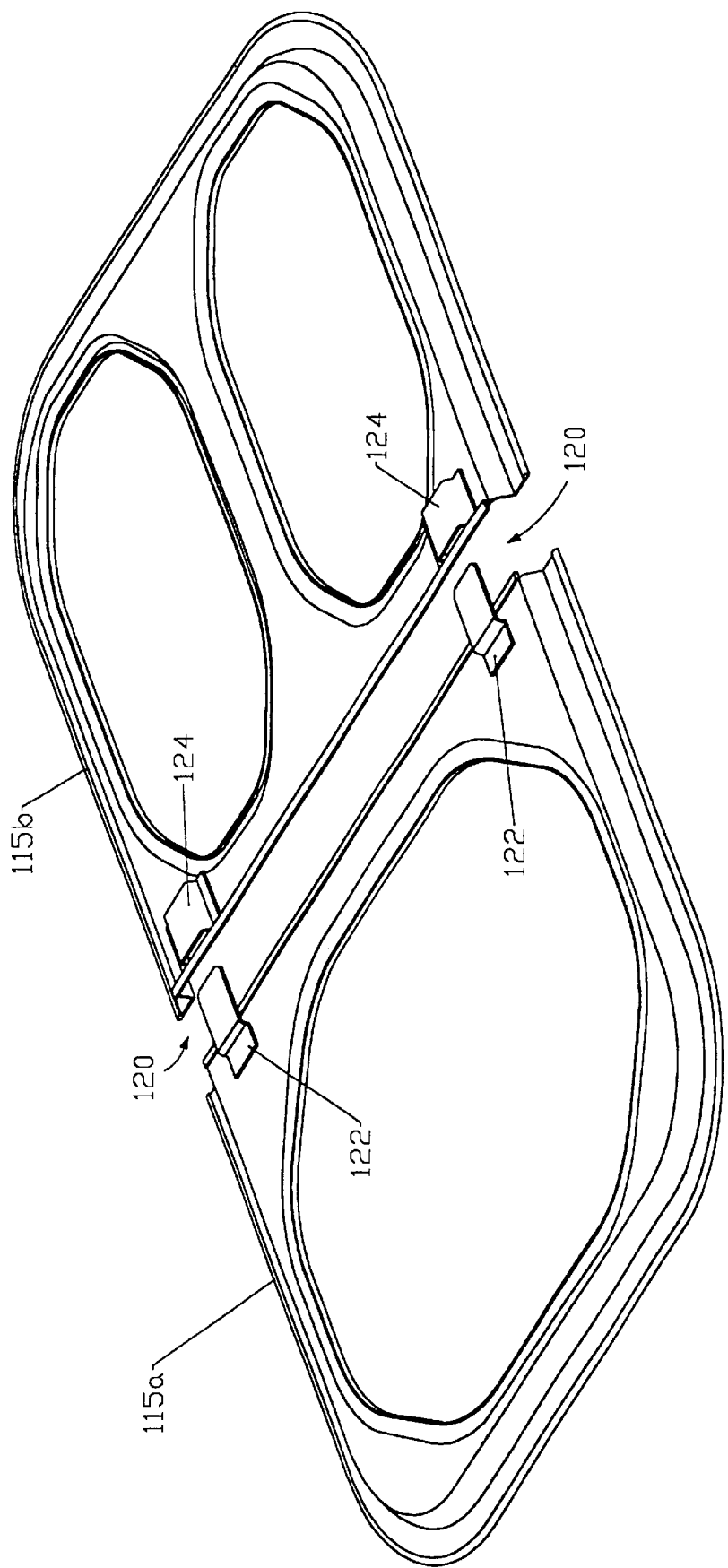
FIG. 4 is a perspective view of the supporting rack of the serving set shown in a disassembled condition.

The supporting rack 115 provides structures comprising collapsing means including, but not limited to, the following structures. Advantageously, the supporting rack 115 is constructed to be easily disassembled into half sections 115a, 115b as shown in FIG. 4 for packaging and storage. In one embodiment this is accomplished by the use of a pair of latch assemblies, indicated generally at 120. Each latch assembly 120 is comprised of a tongue bracket 122 which is installed in sliding engagement with a mating hasp 124 such that the half sections 115a, 115b are detachably secured in position.

It will be appreciated by those skilled in the art that various other types of attaching hardware and quick connect/disconnect fasteners may be utilized for detachably securing the half sections 115a, 115b of the supporting rack 115 and such attaching hardware is understood to be within the scope of the present invention In the preferred embodiment the supporting rack 115 is a stamped metal construction and tongue brackets 122 and hasps 124 are secured to the half sections 115a, 115b by weldment or other suitable fasteners such as rivets.

Figure 5:
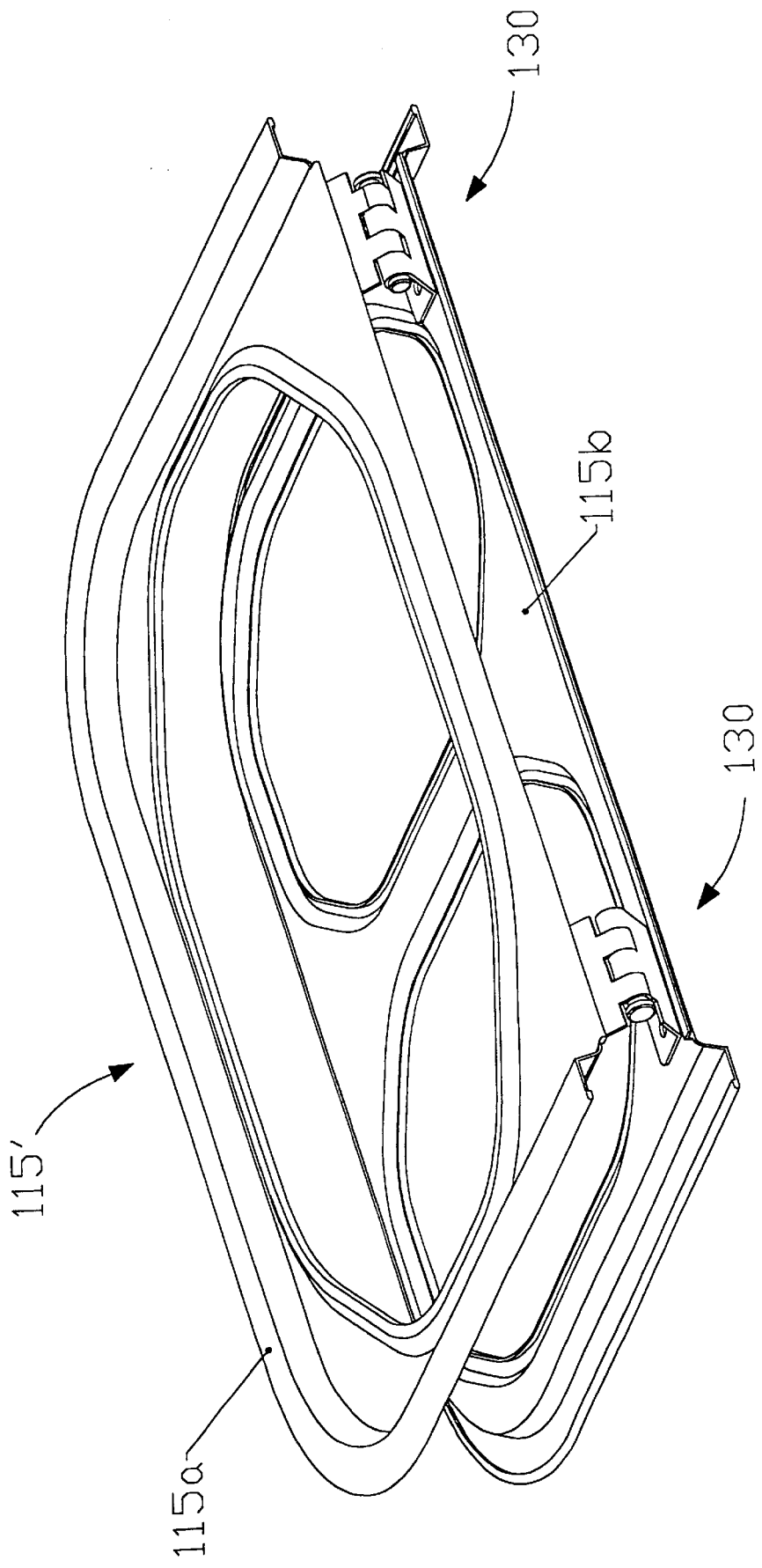
FIG. 5 is a perspective view of an alternative embodiment of the supporting rack of the serving set shown in a folded condition.

In an alternative embodiment the half sections 115a, 115b of supporting rack 115' are permanently joined by hinge assemblies, indicated generally at 130, as shown in FIG. 5. Thus, the supporting rack 115' is foldable 180 degrees onto itself to the position shown for convenient storage within the interior space of the roasting oven 10. Thereafter, the supporting rack 115' is unfolded to a flattened condition for use with the present serving set 100 as described hereinabove.

Figure 6A:
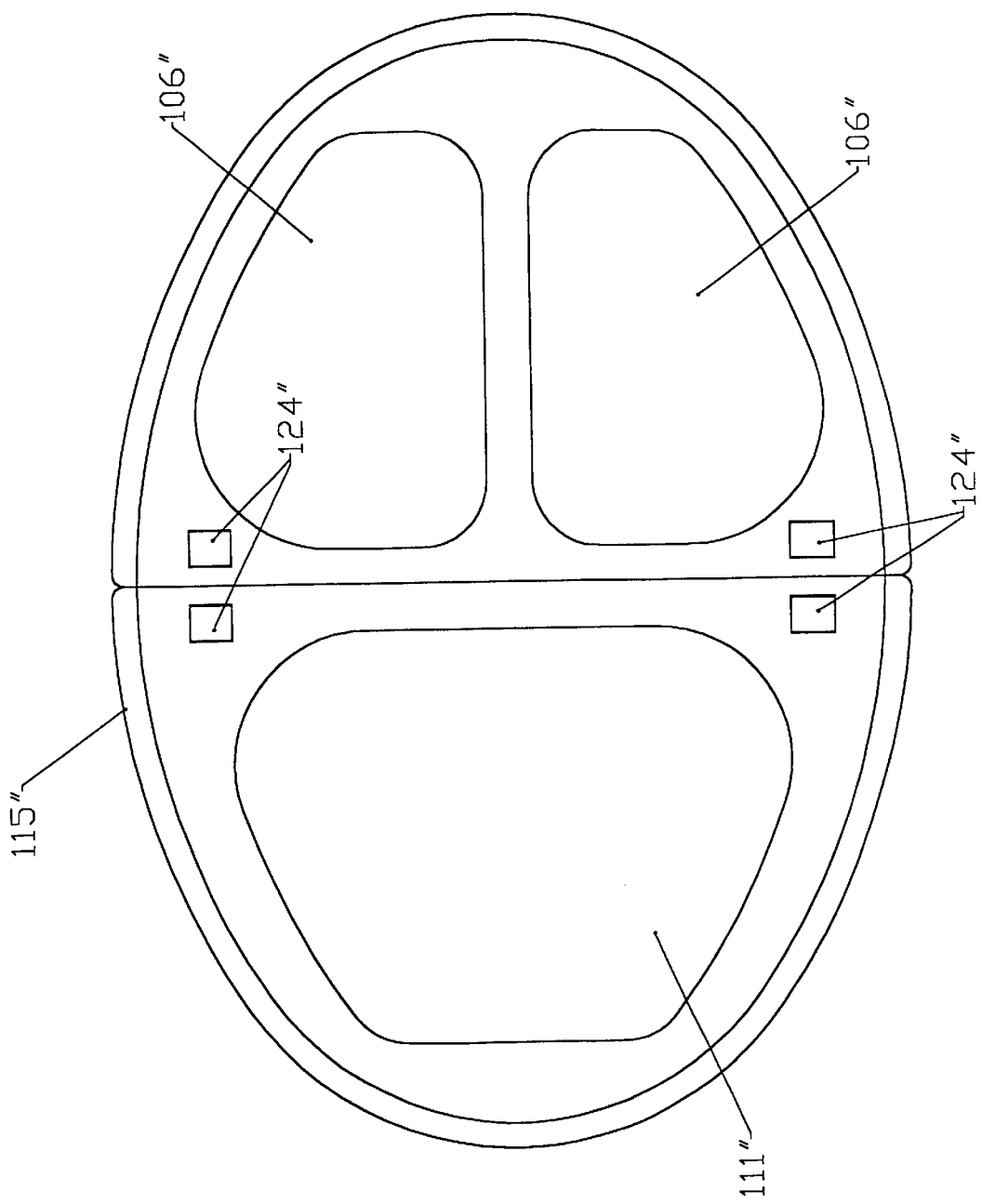
FIG. 6A is a top plan view of an alternative embodiment of the supporting rack in an oval configuration.
Figure 6B:
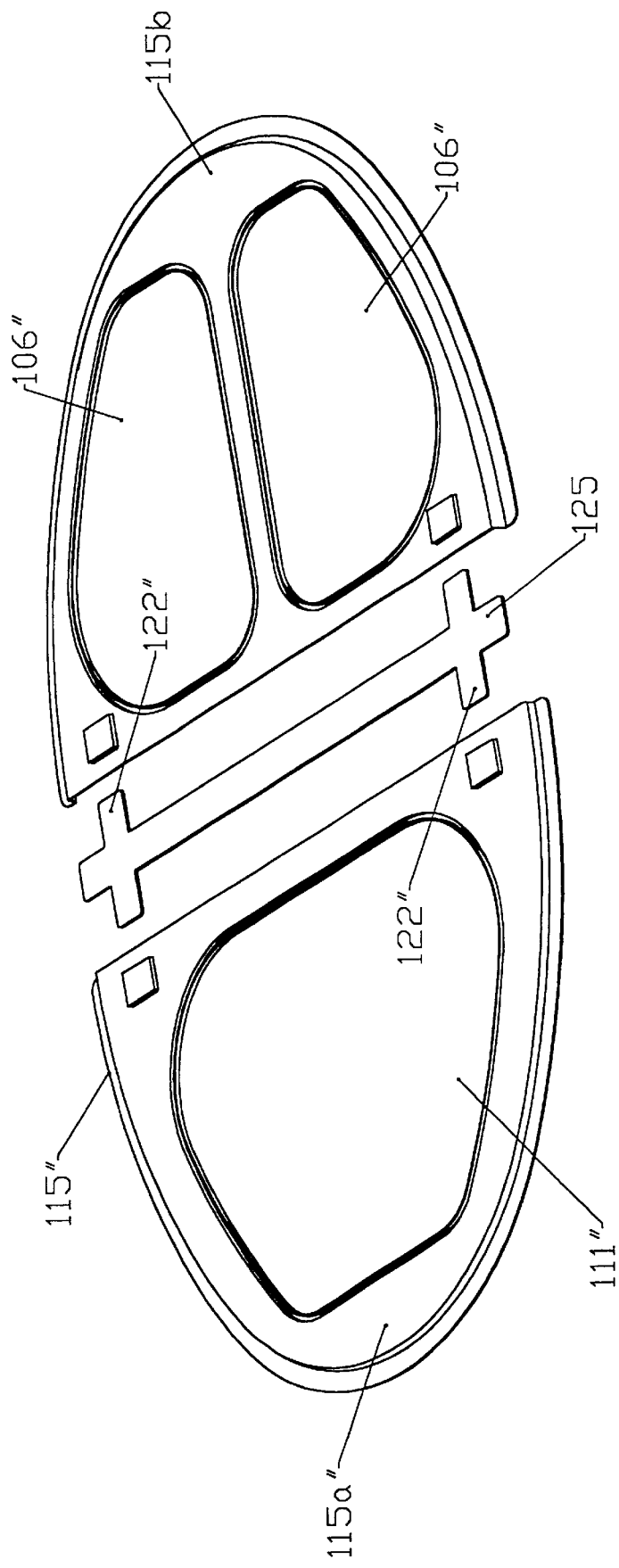
FIG. 6B is a top plan view of the supporting rack of FIG. 6A shown in a disassembled condition.

Of course, the present serving set 100 including the supporting rack 115 can also be adapted for use with roasting ovens or other deep well cookers having different shapes such as an oval configuration. Referring to FIGS. 6A and 6B there is shown therein a modified supporting rack 115" which is oval in configuration having modified openings 106" and 111" formed therein. The food containers (not shown) for this embodiment are configured for mating engagement with their corresponding openings 106", 111". In this embodiment the modified half sections 115a", 115b" are detachably secured by a transverse bracket member 125 whereon a pair of modified tongue brackets 122" are mounted for sliding engagement with mating hasps 124" as shown in FIG. 6B.

Figure 7:
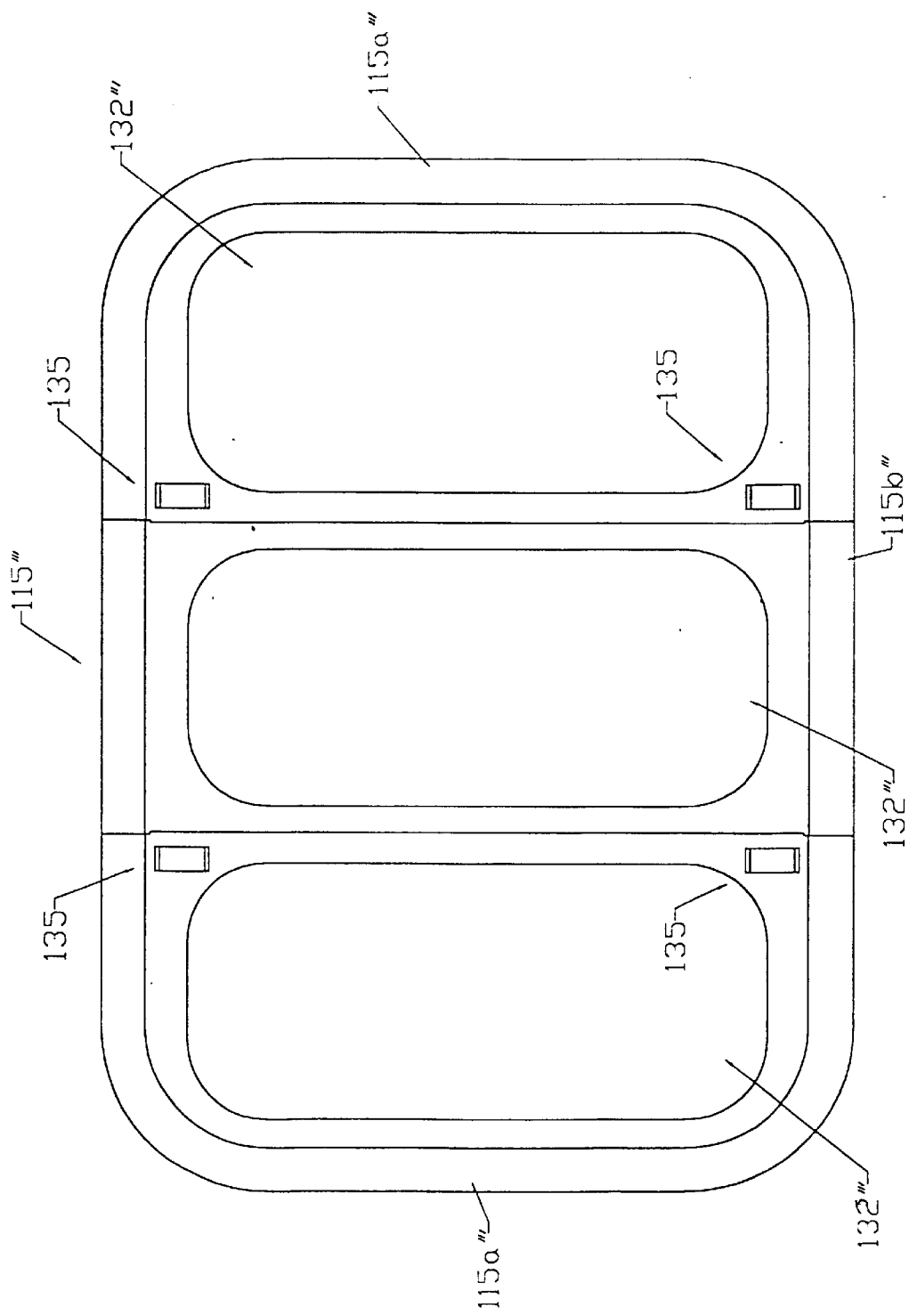
FIG. 7 is a top plan view of an alternative embodiment of the supporting rack.
Figure 8A:
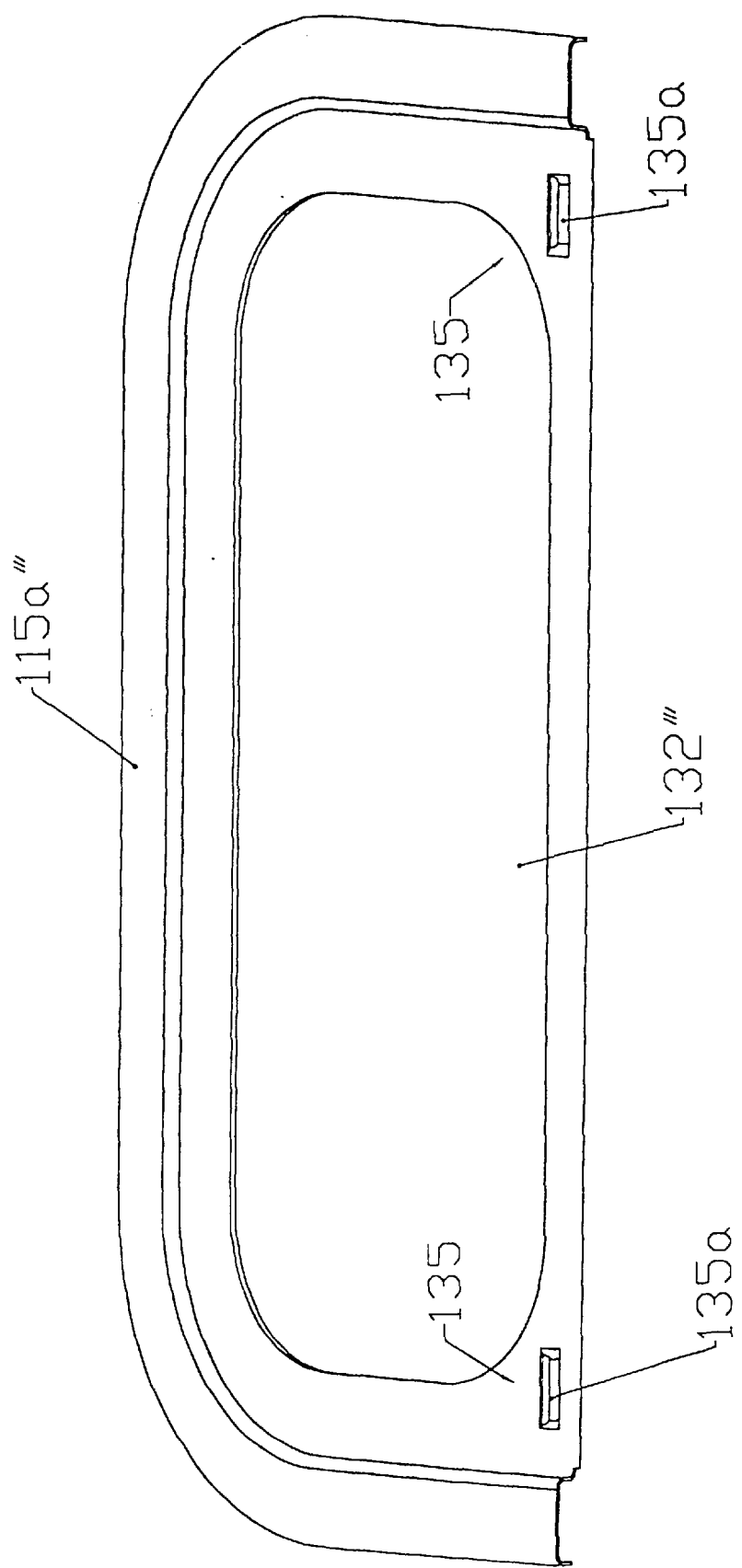
FIG. 8A is a perspective view of the top surface of the D-shaped end section of the supporting rack seen in FIG. 7 showing details thereof.
Figure 8B:
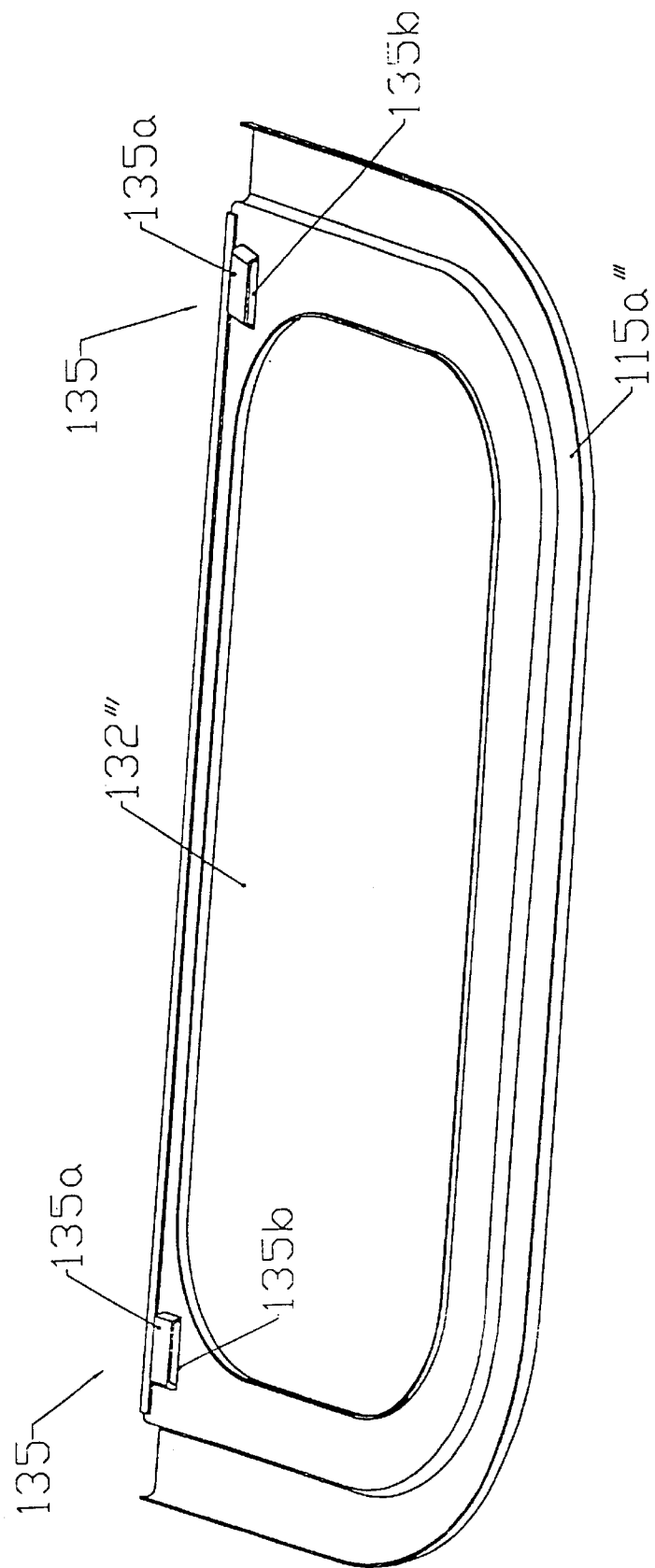
FIG. 8B is a perspective view of the bottom surface of a D-shaped end section of the supporting rack seen in FIG. 7 showing details thereof.
Figure 9A:
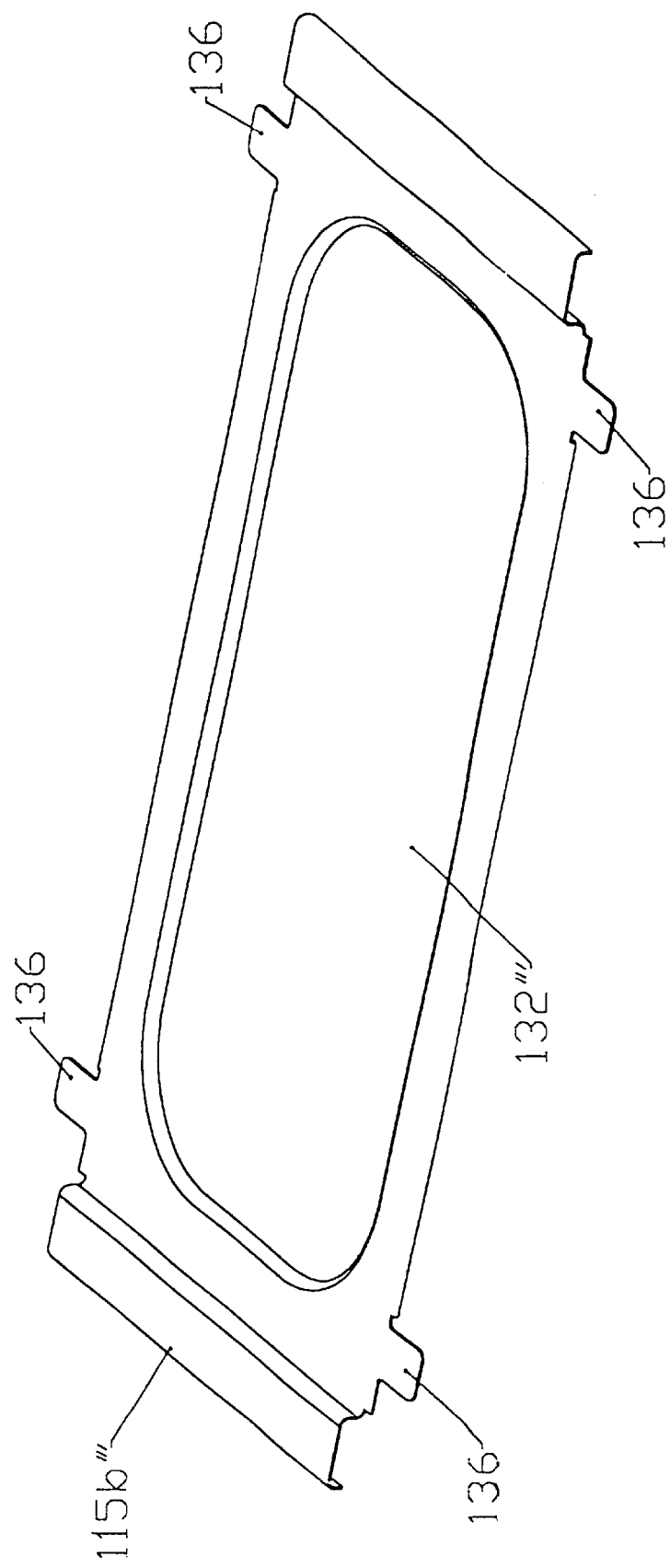
FIG. 9A is a perspective view of the top surface of the center section of the supporting rack seen in FIG. 7 showing details thereof.
Figure 9B:
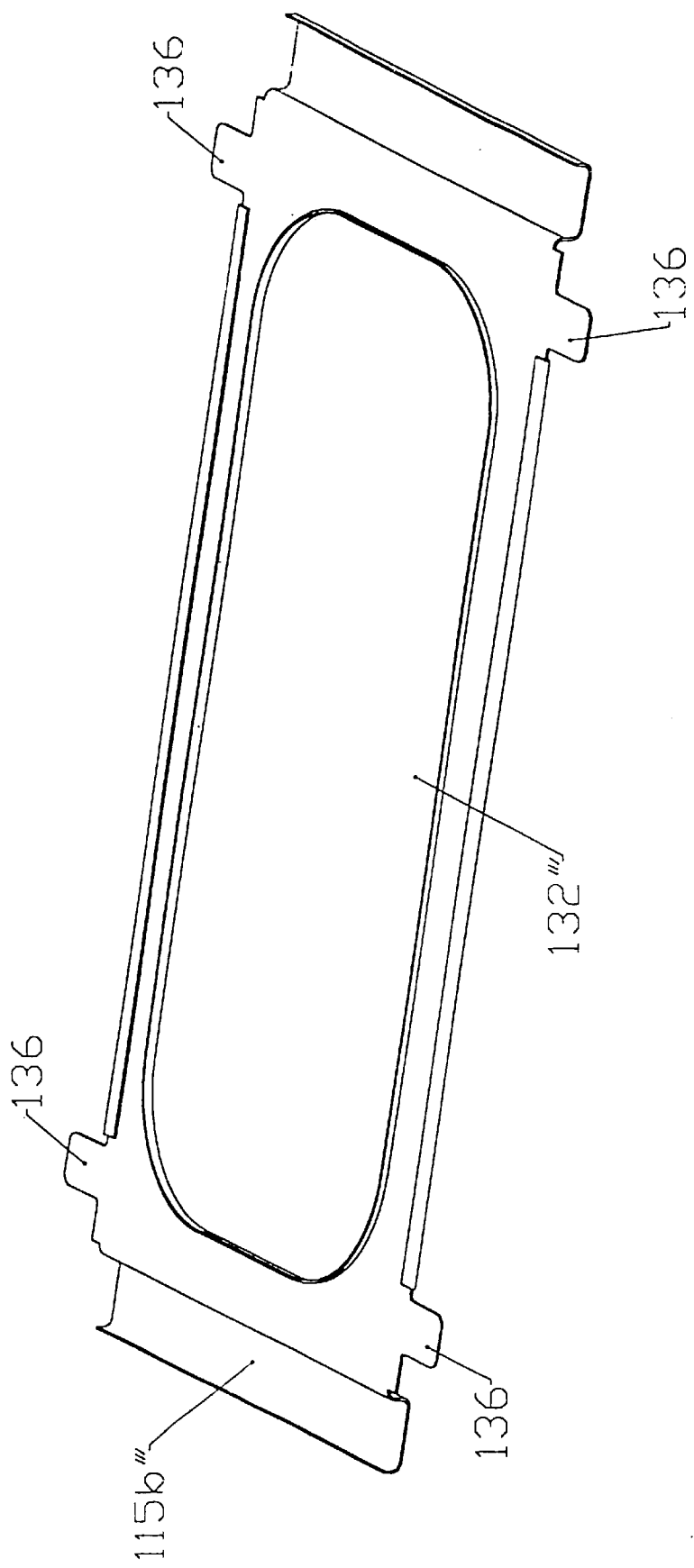
FIG. 9B is a perspective view of the bottom surface of the center section of the supporting rack seen in FIG. 7 showing details thereof.

In FIG. 7 there is shown another alternative embodiment of the supporting rack 115'" which is generally rectangular in configuration. The supporting rack 115'" is divided into three separate sections, namely, two D-shaped end sections 115a'" and a center section 115b'" each having a generally rectangular opening 132'" with corner radii for receiving a corresponding food container (not shown). As more clearly shown in FIGS. 8A and 8B each of the D-shaped end sections 115a'" is a unitary construction conforming to the inner edge of the flange 45a of the cooking liner 45 (FIG. 3C). It can be seen that each end section 115a'" includes a pair of receptacles, indicated generally at 135, which are recessed into the upper surface of each end section 115a'". In the preferred construction receptacles 135 are cut and stamped into the sheet metal end sections 115a'" in a metal fabrication process such that rectangular sections 135a are displaced approximately ⅛ to ¼ inch from the upper surface, but remain integrally attached thereto. The slotted openings 135b are so formed for receiving mating tabs 136 formed on the center section 115b'" shown in FIGS. 9A and 9B.

Figure 10A:
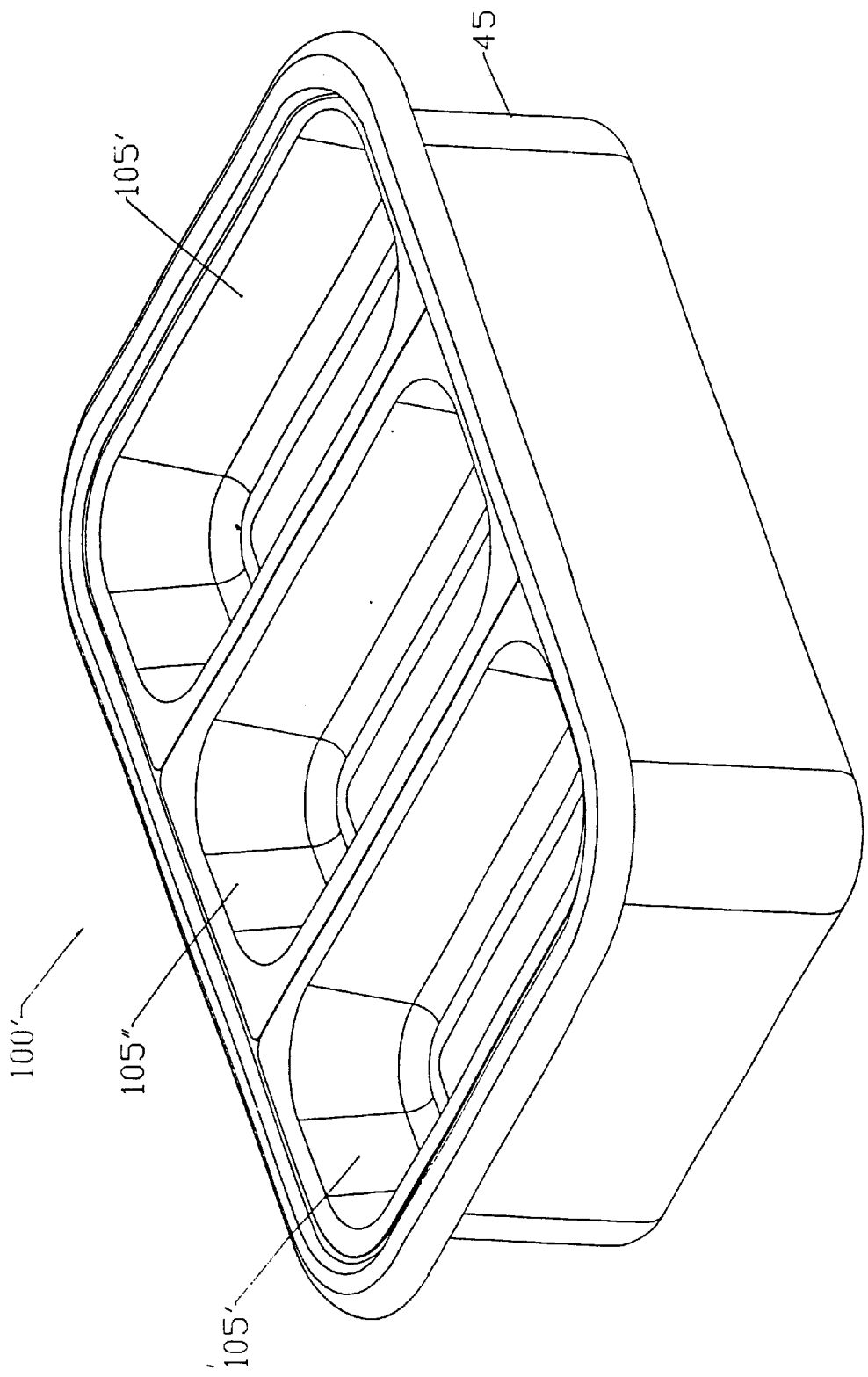
FIG. 10A is a perspective view of an alternative embodiment of the present serving set in a rectangular configuration wherein the supporting rack is not required.
Figure 10B:
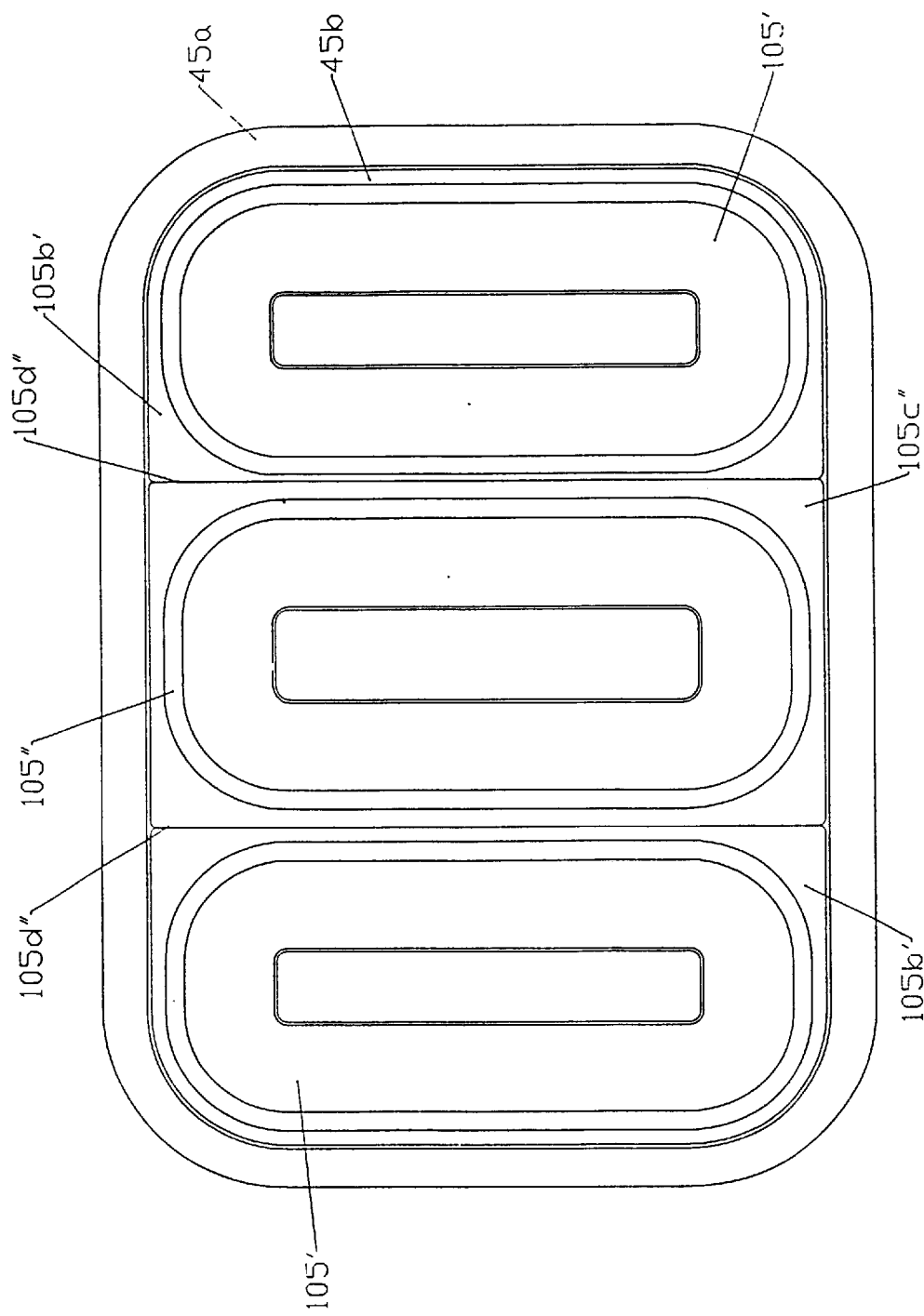
FIG. 10B is a top plan view of the serving set shown in FIG. 7A.

In yet another alternative embodiment of the present serving set 100' as shown in FIG. 10A, the supporting rack 115 is unnecessary due to the modified configuration of the food containers 105'. In this embodiment three generally rectangular food containers 105', 105" including peripheral flanges 105b', 105c' respectively are configured to fit the inner edge 45b of the flange 45a of the cooking liner 45 as shown in FIG. 10B. It can be seen that the peripheral flanges 105b' of the outer pair of containers 105' are generally D-shaped in configuration being interchangeable and fitted to the opposite ends of the cooking liner 45.

Figure 10C:
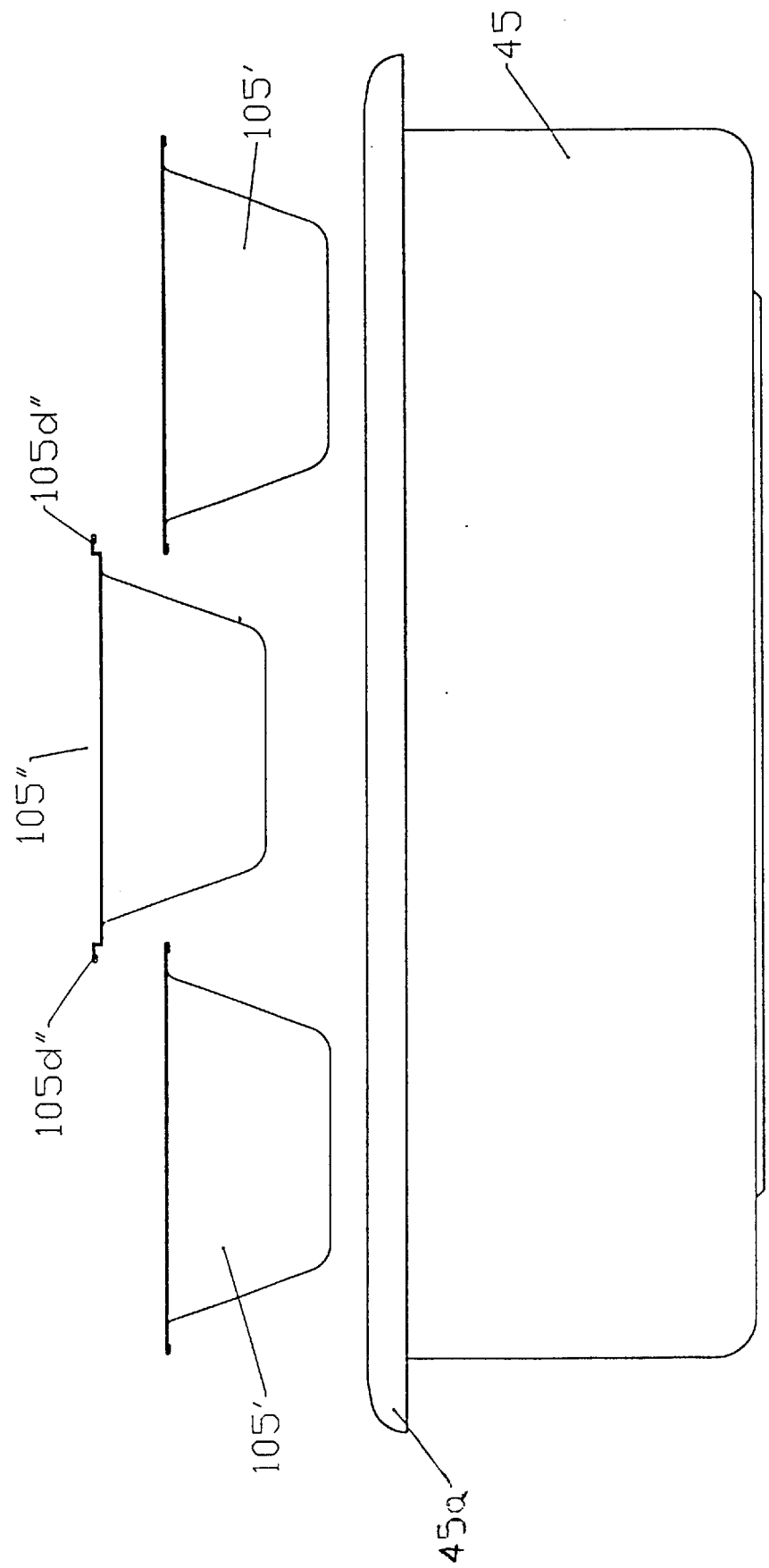
FIG. 10C is an exploded elevational view of the serving set shown in FIG. 7B.

Still referring to FIG. 10B, the center food container 105' includes a rectangular, peripheral flange 105c", which is configured to fit the central portion of the inner edge 45b of the cooking liner 45 as shown. As can be seen in FIG. 10C the lateral edges 105d" of the flange 105c" of the center container 105" are bent at a predetermined offset and are positioned in overlapping relation with the corresponding lateral edges of the outer pair of food containers 105'. In this manner the center food container 105" engages and maintains the outer containers 105' in the positions shown.

Figure 11A:
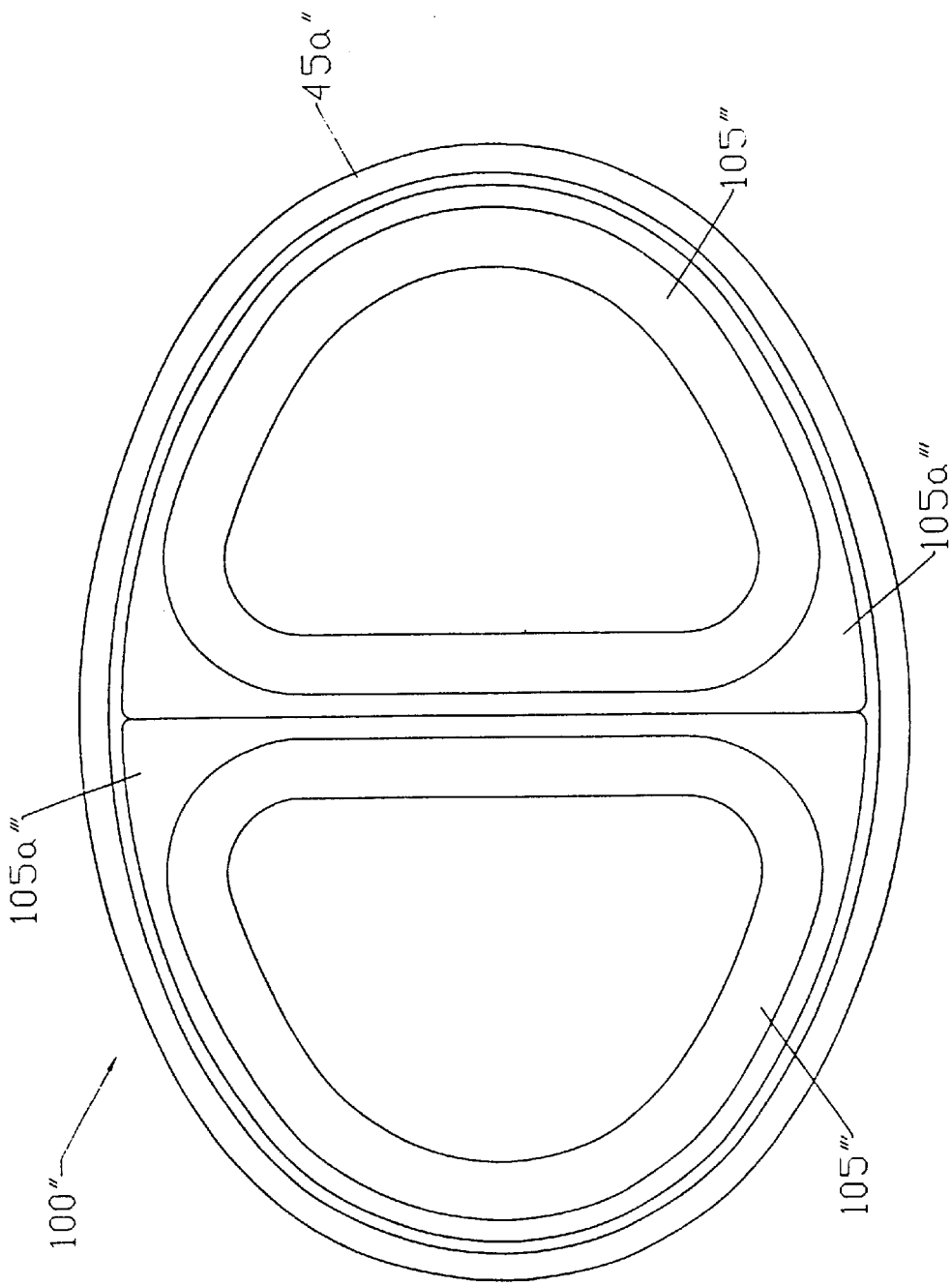
FIG. 11A is a top plan view of an alternative embodiment of the present serving set in an oval configuration.
Figure 11B:
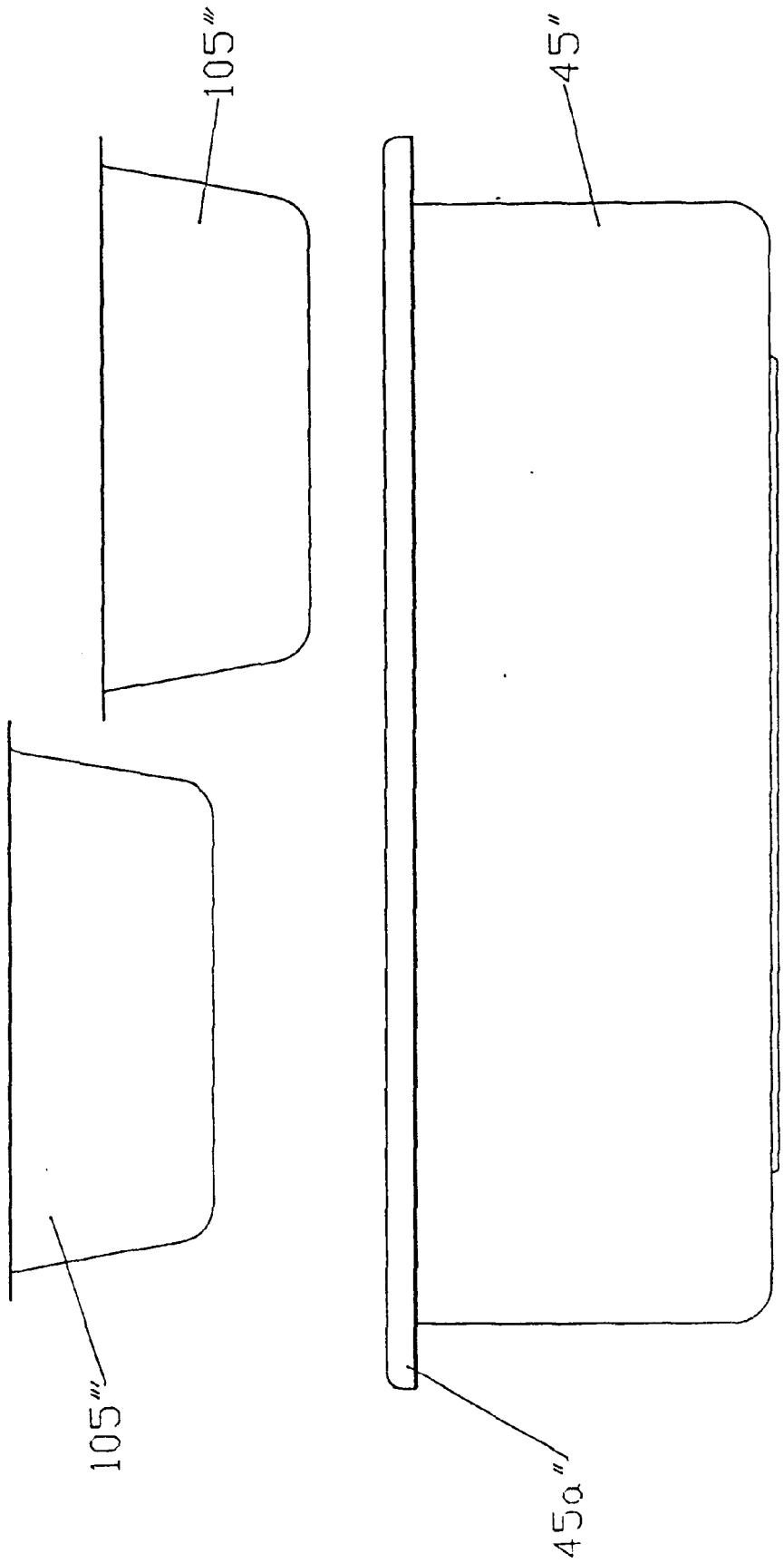
FIG. 11B is an exploded elevational view of the serving set shown in FIG. 11A.

Similarly, the supporting rack 115 is unnecessary in the embodiment of the serving set 100" illustrated in FIGS. 11A and 11B. In this oval configuration of the cooking liner 45", the two food containers 105'" including peripheral flanges 105a'" are configured to fit the inner edge 45b" of the flange 45a" of the cooking liner 45'. It can be seen that the peripheral flanges 105a'" of the pair of containers 105'" are semi-oval in configuration being fitted to the opposite ends of the cooking liner 45".

Figure 12A:
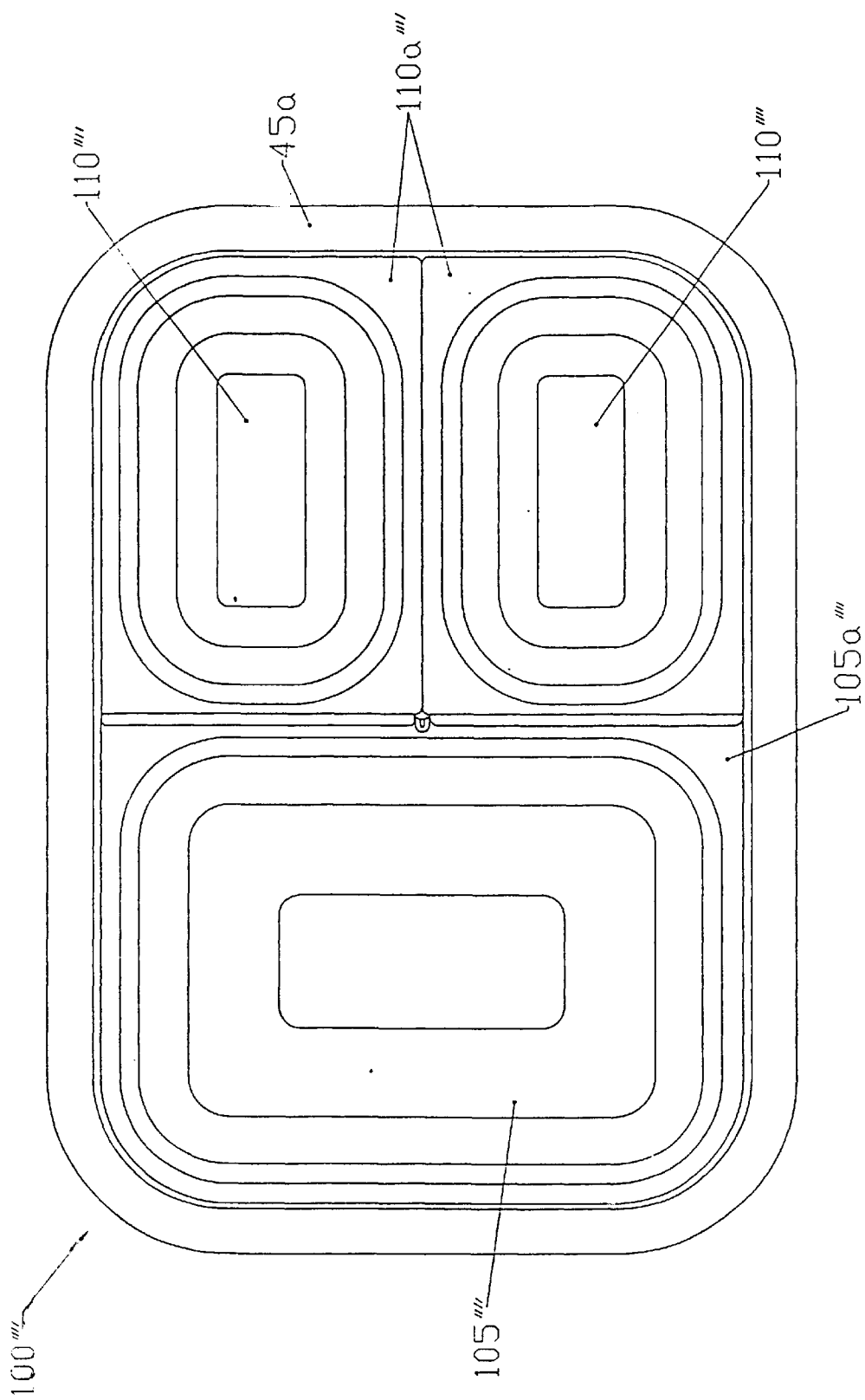
FIG. 12A is a top plan view of an alternative embodiment of the serving set wherein the supporting rack is not required.
Figure 12B:
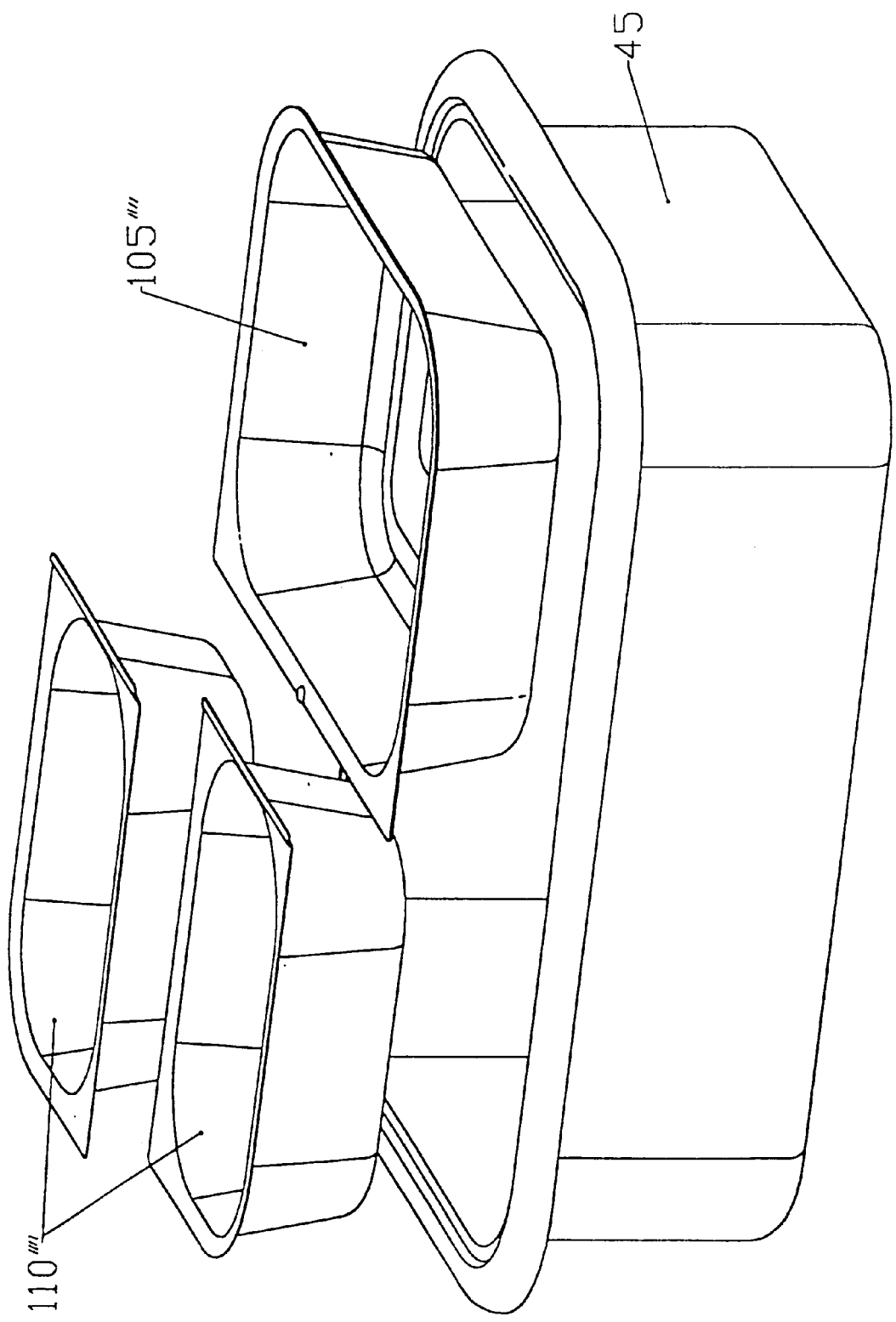
FIG. 12B is an exploded perspective view of the serving set depicted in FIG. 12A.

Referring now to FIG. 12A there is shown yet another embodiment of the serving set 100"" wherein the supporting rack 115 is not required. In this configuration of the serving set, a single large food container 105"" including peripheral flange 105a"" and two smaller food containers 110"" including peripheral flanges 110a"" are configured to fit the inner peripheral edge of the cooking liner 45.

Thus, it can be seen that the present invention provides a versatile food serving set for use in combination with a roasting oven or other deep well cooker, which can be utilized for maintaining food items in a ready-to-eat condition. The food serving set features individual food containers, which can be transferred directly from the refrigerator to the cooker. The serving set includes a supporting rack, which positions the food containers within the cooker during use, and which is collapsible for efficient storage and/or packaging within the interior space of the cooker. In various alternative embodiments the supporting rack is not required as the food containers are provided with integral flanges, which conform to the inner peripheral edge of the cooking liner and support the food containers in position.

Although not specifically illustrated in the drawings, it should be understood that additional equipment and structural components will be provided as necessary, and that all of the components described above are arranged and supported in an appropriate fashion to form a complete and operative roasting oven incorporating features of the present invention.

Moreover, although illustrative embodiments of the invention have been described, a latitude of modification, change, and substitution is intended in the foregoing disclosure, and in certain instances, some features of the invention will be employed without a corresponding use of other features. Accordingly, it is appropriate that the appended claims be construed broadly and in a manner consistent with the scope of the invention.

What is claimed is:

1. An improved deep well cooker having an outer housing, a cooking well having a top opening installed within said housing, a cooking liner disposed within said cooking well, a heat source disposed in heating relation to said cooking well and a temperature control switch electrically interconnected to said heat source wherein the improvement comprises:

a food serving set including a plurality of individual food containers having integral peripheral flanges formed thereon in perpendicular relation thereto, said flanges engaging an inner peripheral edge of said liner in overlapping relation to support said food coutainers therein.

2. The improved deep well cooker of claim 1 wherein said liner is generally rectangular in configuration, said liner receiving three generally rectangular food containers therein including an outer pair of food containers and a center food container arranged in side-by-side relation, wherein said outer pair of food containers each includes a D-shaped peripheral flange and said center food container includes a rectangular peripheral flange disposed in overlapping relation to said inner peripheral edge of said liner, wherein opposed lateral edges of said rectangular peripheral flange are bent at a predetermined angular offset to engage said D-shaped peripheral flanges of said outer pair of food containers securing said outer pair of food containers in sition on said liner.

3. The improved deep well cooker of claim 1 wherein said cooking liner is oval in configuration, said liner receiving two semi-oval food containers arranged in side-by-side relation, wherein each of said food containers includes a semi-oval peripheral flange disposed in overlapping relation to an inner peripheral edge of said liner.

4. The improved deep well cooker of claim 1 wherein said liner is generally rectangular in configuration, said liner receiving three generally rectangular food containers therein including a single large container and a pair of smaller containers therein, wherein said single large container includes a unitary D-shaped peripheral flange disposed in overlapping relation to one-half of said inner peripheral edge of said liner and said pair of smaller containers each includes a modified rectangular flange, wherein said modified rectangular flanges are symmetrically juxtaposed to define a bipartite D-shaped flange disposed in overlapping relation to one-half of said inner peripheral edge of said liner, wherein centrally disposed edges of said modified rectangular flanges are bent at a predetermined angular offset to engage an adjoining edge of said D-shaped peripheral flange to secure said single large container in position on said inner peripheral edge of said liner.

5. A food serving set for use in combination with a deep well cooker having an interior space including a top opening, said food serving set comprising:

a plurality of individual food containers of a predetermined configuration; and a supporting rack including collapsing means, said supporting rack further including a plurality of openings formed therein conforming to said predetermined configuration for receiving said food containers; said supporting rack being disposed in detachable engagement within said top opening of said deep well cooker such that said food containers are disposed within said interior space for heating of said food items.

6. The food serving set of claim 5 wherein said supporting rack includes two D-shaped end sections and a generally rectangular center section arranged in side-by-side relation such that when assembled said sections conform to said top opening of said deep well cooker.

7. The food serving set of claim 6 wherein said plurality of openings are the same in configuration.

8. The food serving set of claim 7 wherein said plurality of openings are generally rectangular.

9. The food serving set of claim 8 wherein said collapsing means includes at least one slotted receptacle formed on each of said D-shaped end sections for receiving mating tabs formed on said center sections in sliding engagement.

10. The food serving set of claim 9 wherein said at least one slotted receptacle is recessed into the surface of said D-shaped end sections by a metal forming process.

* * * * *

UNITED STATES PATENT AND TRADEMARK OFFICE
CERTIFICATE OF CORRECTION

PATENT NO. : 6,653,602 B2  Page 1 of 1
DATED : November 25, 2003
INVENTOR(S) : George T.C. Li It is certified that error appears in the above-identified patent and that said Letters Patent is hereby corrected as shown below:

<u>Title page,</u>
Item [73], Assignee, change "Acerne" to -- Acorne --.

Signed and Sealed this

Third Day of February, 2004

JON W. DUDAS
*Acting Director of the United States Patent and Trademark Office*